United States Patent
Moritani et al.

(10) Patent No.: US 10,220,842 B2
(45) Date of Patent: Mar. 5, 2019

(54) VEHICLE CONTROL DEVICE

(71) Applicant: MAZDA MOTOR CORPORATION, Hiroshima (JP)

(72) Inventors: Takayuki Moritani, Hiroshima (JP); Takeharu Yamashita, Hiroshima (JP); Kouichi Kojima, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 22 days.

(21) Appl. No.: 15/411,186

(22) Filed: Jan. 20, 2017

(65) Prior Publication Data

US 2017/0232964 A1  Aug. 17, 2017

(30) Foreign Application Priority Data

Feb. 12, 2016  (JP) .................................. 2016-024988

(51) Int. Cl.
*B60W 30/09* (2012.01)
*B60Q 9/00* (2006.01)
*B60T 7/22* (2006.01)

(52) U.S. Cl.
CPC ............. *B60W 30/09* (2013.01); *B60Q 9/008* (2013.01); *B60T 7/22* (2013.01); *B60T 2201/022* (2013.01); *B60T 2210/32* (2013.01); *B60W 2550/10* (2013.01); *B60W 2710/18* (2013.01)

(58) Field of Classification Search
None
See application file for complete search history.

(56) References Cited

U.S. PATENT DOCUMENTS

2016/0335892 A1   11/2016   Okada et al.

FOREIGN PATENT DOCUMENTS

| JP | 2005-138748 A | 6/2005 | |
| JP | 2010-132030 A | 6/2010 | |
| JP | 2015-170233 A | 9/2015 | |
| WO | WO-2015136958 A1 * | 9/2015 | ............... B60T 7/22 |

OTHER PUBLICATIONS

JP Office Action dated Jan. 29, 2018, from corresponding JP Appl No. 2016-024988, 4 pp.

\* cited by examiner

*Primary Examiner* — Todd M Melton
*Assistant Examiner* — Jason R Roberson
(74) *Attorney, Agent, or Firm* — Studebaker & Brackett PC

(57) ABSTRACT

When an own vehicle V1 crosses an opposite traffic lane R2 at an intersection to make a right turn, an ECU 20 such as a vehicle control device detects a presence of a crossing person P crossing a crosswalk CW existing near the intersection on a road R3 which the vehicle V1 is directed to enter by making the right turn, detects a size of a space between the crosswalk SP on which the detected crossing person P crosses and the opposite traffic lane, and when performing a control for braking the vehicle V1 so as to avoid a collision of at least the vehicle V1 with the crossing person P, changes a timing to perform the control for braking the vehicle V1 based on the detected size of the space SP up to the crosswalk CW.

4 Claims, 7 Drawing Sheets

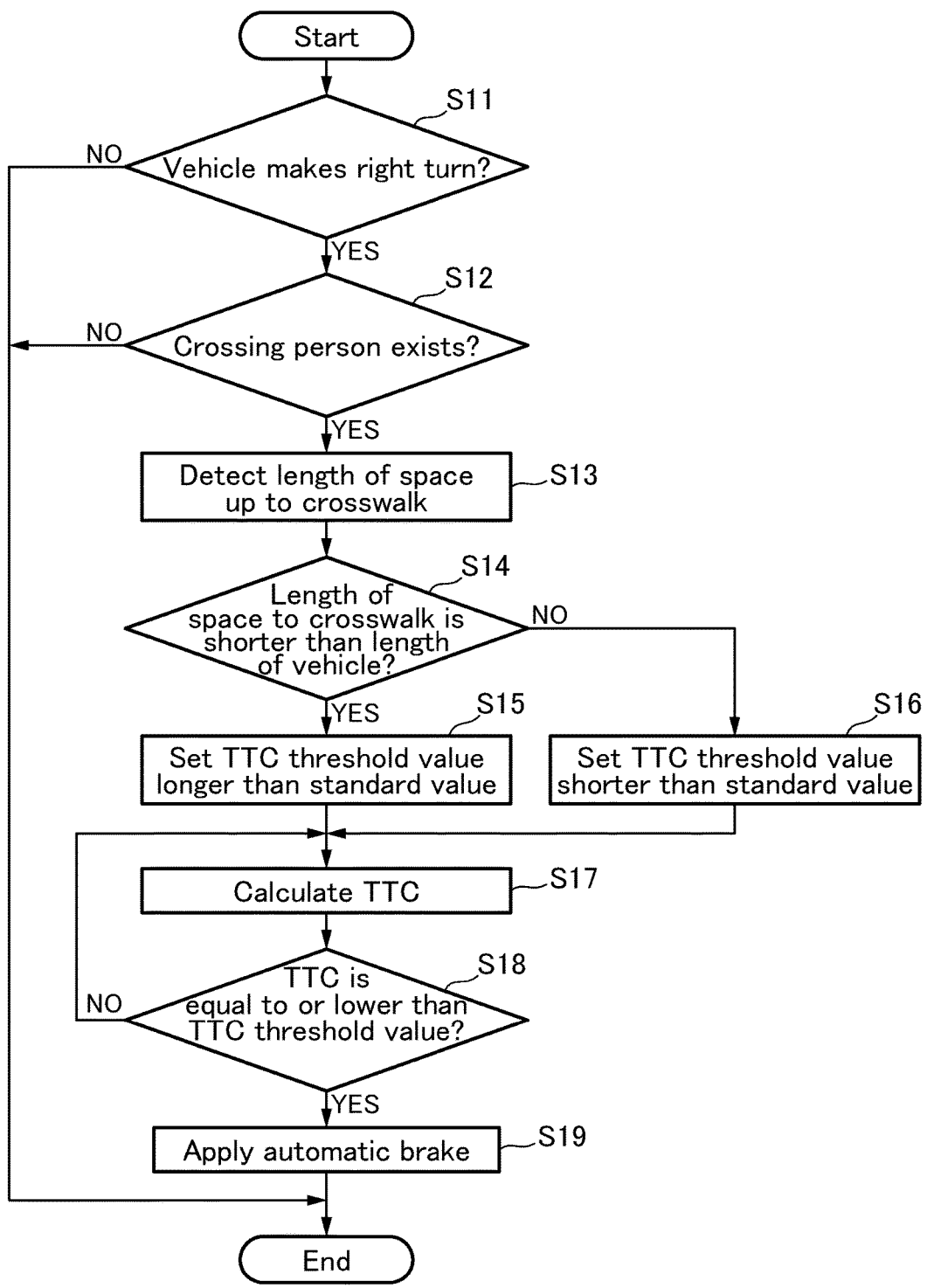

VEHICLE CONTROL DEVICE

BACKGROUND OF THE INVENTION

Field of the Invention

The present invention relates to a vehicle control device, and more particularly to a vehicle control device for performing a control for braking a vehicle in which the device is used so as to avoid a collision of the vehicle with an object (target article) which is present ahead.

Description of Related Art

Conventionally, proposals have been made on a technique for performing a control so that a vehicle may be applied with a braking effort automatically (in other words, automatic braking) in order to avoid a collision of the vehicle with an object which is present ahead. For example, Patent Document 1 (Japanese Laid-Open Patent Publication 2005-138748A) discloses a technique wherein, when a vehicle is steered so that it crosses an opposite traffic lane, a threshold Value for initiating the automatic braking is changed from a normal threshold value so that the automatic braking may not be applied or made difficult to be applied to thereby prevent the own vehicle from being decelerated or stopped in the opposite traffic lane while the own vehicle is crossing the opposite traffic lane. In addition, for example, Patent Document 2 (Japanese Laid-Open Patent Publication 2010-132030A) discloses a technique wherein, in a case where a vehicle is being controlled to make a turn in a direction in which the vehicle crosses an opposite traffic lane, but there is a high risk of a collision with another vehicle rapidly approaching on the opposite traffic lane, application of such automatic braking is restrained or made inactive when a passenger is sitting on a front, side seat so that the passenger on the front, side seat may be protected from the possible collision of the vehicle with the rapidly approaching vehicle, and the automatic braking is surely applied when there is no passenger on the front, side seat to avoid the collision of the vehicle with the rapidly approaching vehicle.

BRIEF SUMMARY OF THE INVENTION

Technical Problem

Meanwhile, when a vehicle is being controlled to cross an opposite traffic lane to make a turn, in a case where there is a person such as a pedestrian that is crossing a road to which the vehicle is headed or directed as the result of the turn, the automatic braking is applied to avoid a possible collision of the own vehicle with the crossing person. In such a case, if the vehicle stops within opposite traffic lane, there is a risk of the own vehicle being hit by another vehicle approaching on the opposite traffic lane In order to avoid such an accident, a possible way would be that the automatic braking is applied so that the own vehicle can be stopped within its own lane (it refers to the lane on which the vehicle has been running, and hereinafter similarly applied as above) before it approaches the opposite traffic lane to thereby avoid the collision of the own vehicle with the crossing person and with the vehicle approaching on the opposite traffic lane.

However, in the case where the road to which the vehicle is being headed or directed to enter by making a required turn has an enough distance from the opposite traffic lane to a crosswalk on which the person is crossing, it may be a more desirable control to apply the automatic braking so that the vehicle can be stopped within the space existing between such crosswalk and the opposite traffic lane, rather than the own vehicle being stopped within the own lane, since it may be possible to avoid the collision of the own vehicle with the crossing person and with the vehicle approaching on the opposite traffic lane, and at the same time, an intention of a driver trying to make the turn is given priority.

The present invention has been made to solve the above problems inherent to the conventional technique, and an object thereof is to provide a vehicle control device which may appropriately perform a control for braking an own vehicle so as to avoid both collisions of the own vehicle with a crossing person, and the own vehicle with a vehicle on an opposite traffic lane, when the own vehicle crosses the opposite traffic lane to make a right or left turn.

Solution to Problem

In order to achieve the above object, the present invention provides a vehicle control device, including: a crossing person detecting unit configured to, when a vehicle crosses an opposite traffic lane at an intersection to make a right or left turn, detect a presence of a crossing person crossing a crosswalk existing near the intersection and on a road to which the vehicle is directed to enter by making the right or left turn; a space detecting unit configured to, when the presence of the crossing person crossing the crosswalk is detected by the crossing person detecting unit, detect a size of a space between the crosswalk and the opposite traffic lane; and a braking controlling unit configured to perform a control for braking the vehicle in order to avoid a collision of the vehicle with the crossing person, wherein the braking controlling unit is configured to change a timing for performing the control for braking the vehicle, based on the size of the space detected by the space detecting unit.

In the vehicle control device in accordance with the present invention having the above features, if there is a crossing person crossing the crosswalk existing near the intersection on the road to which the own vehicle (subject vehicle/host vehicle) is headed as a result of a right or left turn when the own vehicle is being controlled to cross the opposite traffic lane at the intersection by making a right or left turn, the size of the space between the crosswalk and the opposite traffic lane is detected for changing the timing for performing the control for braking the own vehicle based on the size of the space. Thus, the own vehicle can be stopped at an appropriate position depending on the situation through the control for braking the own vehicle to thereby appropriately avoid both collisions of the own vehicle with the crossing person, and the own vehicle with the vehicle approaching on the opposite traffic lane.

Further, according to a relevant ordinance, although the term "crosswalk" is defined as "a part of a road designated by a road marker or a road sign as a place for use by pedestrians for crossing the road," the present application is intended by the term to include not only those crosswalks defined in the ordinance, but also a "bicycle crossing strip" dedicated for bicycles. In addition, according to the present specification, the term "crossing person" is used to include not only pedestrians but also various other objects (particularly moving objects) such as bicycles crossing a road on the crosswalk.

In the vehicle control device of the present invention, preferably, the space detecting unit is configured to detect a length of the space along the road to which the vehicle is directed to enter by making the right or left turn, as the size of the space, and the braking controlling unit is configured to change the timing for performing the control for braking the vehicle in accordance with a magnitude relationship between the length of the space detected by the space detecting unit and a longitudinal length of the vehicle.

According to the vehicle control device of the present invention having the above features, since the timing for performing the control for braking the own vehicle is changed based on the dimensional relationship between the length of the space from the opposite traffic lane to the crosswalk and the longitudinal length of the own vehicle, it is possible to securely stop the own vehicle at an appropriately position depending on the situation by the control for braking the own vehicle.

In the vehicle control device of the present invention, preferably, when the length of the space is shorter than the longitudinal length, the braking controlling unit is configured to make a timing for starting the control for braking the vehicle earlier than when the length of the space is longer than the longitudinal length.

According to the vehicle control device of the present invention having the above features, when the space from the opposite traffic lane to the crosswalk is small, the control for braking the own vehicle may be started relatively early so that the own vehicle can be stopped on its own lane prior to arriving at the opposite traffic lane. On the other hand, if the space to the crosswalk is large, the control for braking the own vehicle may be started at a relatively late timing so that the own vehicle can be stopped within the space in the vehicle control device of the present invention thus configured, it is possible to avoid both collisions of the own vehicle with the crossing person, and of the own vehicle with the vehicle approaching on the opposite traffic lane more securely.

In addition, in the present invention, when the space to the crosswalk is large, since a control for braking the own vehicle is performed so that the own vehicle can he stopped within the space past the opposite traffic lane, it is possible to appropriately give priority to the intention of the driver trying to make a right or left turn.

In the vehicle control device of the present invention, preferably, the braking controlling unit is configured to determine a Time to Collision (TTC) of the vehicle with respect to the crossing person, based on a distance from the vehicle to the crossing person and a relative speed of the vehicle with respect to the crossing person, in order to start the control for braking the vehicle when the Time to Collision becomes equal to or smaller than a predetermined threshold value, and, when the length of the space is shorter than the longitudinal length, the braking controlling unit is configured to set the threshold value larger than when the length of the space is longer than the longitudinal length, in order to make the timing for starting the control earlier.

In the vehicle control device of the present invention, preferably, when the length of the space is shorter than the longitudinal length, the braking controlling unit is configured to set the timing for performing the control for braking the vehicle so that the vehicle can be stopped within an own lane before reaching the opposite traffic lane by performing the control for braking the vehicle, and, when the length of the space is longer than the longitudinal length, the braking controlling unit is configured to set the timing for performing the control for braking the vehicle so that the vehicle can he stopped within the space by performing the control for braking the vehicle.

In the vehicle control device of the present invention having the above features, it is possible to securely restrain the vehicle from stopping on the opposite lane, that is to say, it is possible to securely prevent the vehicle from colliding with the crossing person, through the control for braking the own vehicle so as to avoid the collision of the own vehicle and the crossing person.

In accordance with the vehicle control device of the present invention, preferably, further includes an alarm controlling unit configured to provide an alarm to a driver, when the vehicle crosses the opposite traffic lane to make the right or left turn, the alarm controlling unit is configured to determine a possibility of the vehicle colliding with another vehicle approaching on the opposite traffic lane, and, when it is determined that there is no possibility of the vehicle colliding with another vehicle, the alarm controlling unit is configured to inhibit execution of the control for braking the vehicle by the braking controlling unit, and to provide the alarm to the driver.

According to the vehicle control device of the present invention having the above features, if it is determined that there is no possibility of the own vehicle colliding with the oncoming vehicle, it is possible to inhibit the execution of the control for braking the own vehicle, and just give an alarm to the driver to thereby appropriately give priority to the intention of the driver trying to make a right or left turn.

According to the vehicle control device of the present invention, it is possible to appropriately perform a control for braking a vehicle so as to avoid both collisions of the own vehicle with a crossing person, and the own vehicle with a vehicle approaching on the opposite traffic lane, when the own vehicle crosses the opposite traffic lane to make a right or left turn.

BRIEF DESCRIPTION OF THE SEVERAL VIEWS OF THE DRAWINGS

FIG. 7 is a flowchart depicting an automatic braking control according to one embodiment of the present invention.

DETAILED DESCRIPTION OF THE INVENTION

With reference to the accompanying drawings, a vehicle control device according to one embodiment of the present invention will now be described.

[System Configuration]

Figure 1:
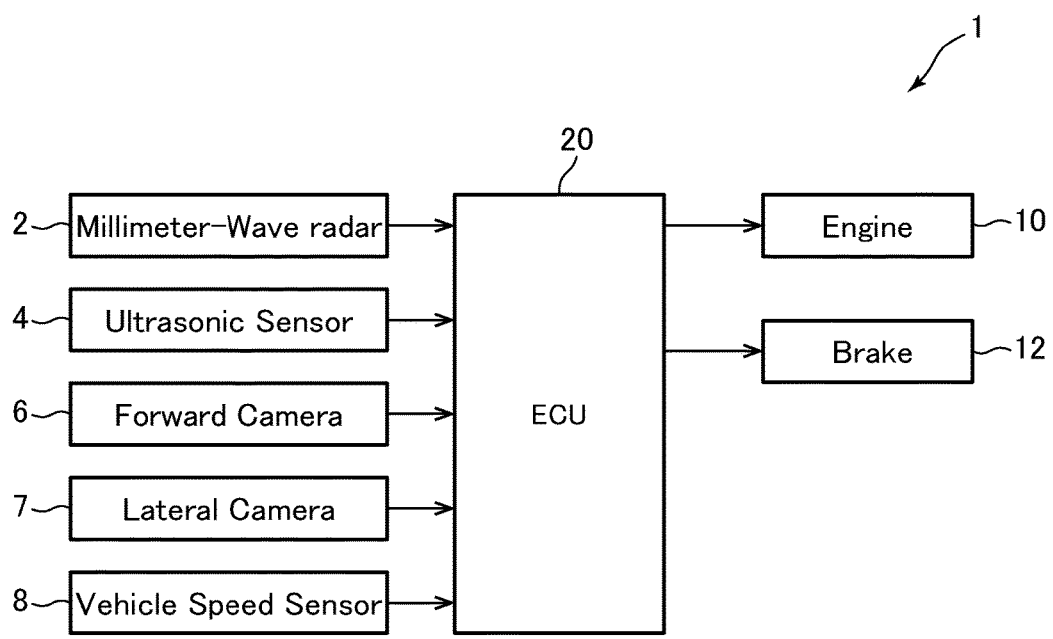
FIG. 1 is a block diagram depicting an electric system of a vehicle to which a vehicle control device according to one embodiment of the present invention is mounted.
Figure 2:
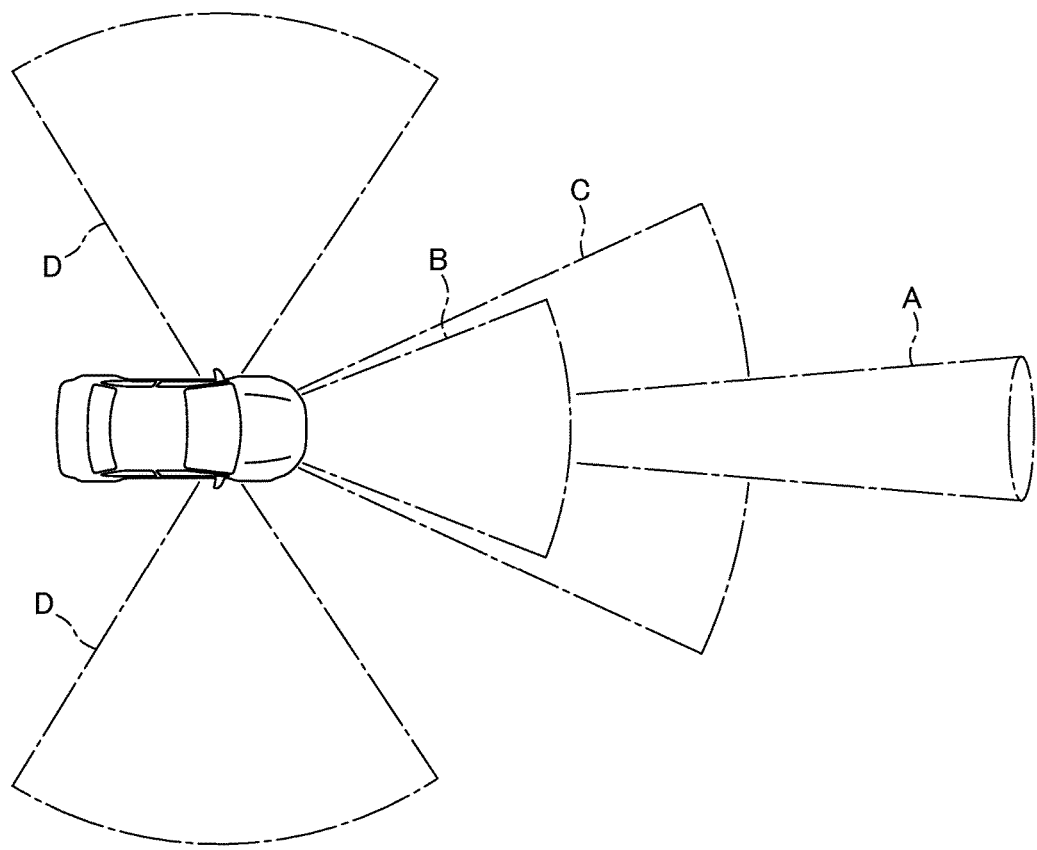
FIG. 2 is a conceptual diagram depicting a detection range of various sensors on a vehicle to which a vehicle control device according to one embodiment of the present invention is mounted.

First of all, with reference to FIGS. 1 and 2, a configuration of a vehicle control device according to one embodiment of the present invention will be described. FIG. 1 is a block diagram depicting an electrical system of a vehicle to which a vehicle control device according to one embodiment of the present invention is mounted, and FIG. 2 is a conceptual diagram depicting an example of a detection range of various sensors on a vehicle to which a vehicle control device according to one embodiment of the present invention is mounted.

As shown in FIG. 1, in a vehicle 1, signals from a millimeter-wave radar 2, an ultrasonic sensor 4, a forward camera 6, a lateral camera 7 and a vehicle speed sensor 8 are primarily introduced into an ECU (Electronic Control Unit) 20 such as a vehicle control device. Further, it is to be noted that the vehicle 1 may hereinafter be appropriately referred as an "own vehicle" and/or an "own vehicle V1".

The millimeter-wave radar 2 emits electric waves toward a predetermined angular range A ahead of the own vehicle (refer to FIG. 2) to detect a distance between the own vehicle and an object which is present ahead and/or a relative speed of the own vehicle and the object which is present ahead (for example, a preceding vehicle and/or an oncoming vehicle and/or a pedestrian and/or a bicycle, and hereinafter similarly referred as above) from a time difference between the transmission wave and the receiving wave and/or the strength of the receiving wave. The millimeter-radar 2 can detect an object which is present up to about 100 m ahead of the own vehicle, for example.

The ultrasonic sensor 4 functions to emit ultrasonic waves toward the forward direction of the vehicle in an angular range B which is wider than the detecting range of the above described millimeter-wave radar (refer to FIG. 2) to detect the distance between the own vehicle and the object which is present ahead and/or the relative speed of the own vehicle and the object which is present ahead, from a time difference from the time when the ultrasonic wave is radiated to the time when a reflected wave is received from a target. The ultrasonic sensor 4 can detect an object which is present up to about 10 m ahead of the own vehicle, for example.

Typically, the forward camera 6 and the lateral camera 7 are both monocular cameras, and they take images of the object in the angular ranges C and D which are wider than the detection range of the above described millimeter-wave radar, at a position ahead of and lateral to the own vehicle (typically, a forward and lateral positions of the own vehicle) (refer to FIG. 2). Based on the images taken by the forward camera 6 and the lateral camera 7 during the own vehicle is moving, it is possible to distinguish an object which is present ahead of the own vehicle and/or estimate the distance between the own vehicle and the object which is present ahead.

Based on the signals input from the millimeter-wave radar 2, the ultrasonic sensor 4, the forward camera 6 and the lateral camera 7, as well as a signal input from the vehicle speed sensor 8 for detecting vehicle speed of the own vehicle, the ECU 20 provides control signals to an engine 10 and a brake 12 (typically, a hydraulic brake) to control them. Particularly, in the present embodiment, the ECU 20 determines, based on the distance between the own vehicle and the object which is present ahead and/or the relative speed of the own vehicle and the object which is present ahead, possibility of the own vehicle colliding with the object ahead, and if it is determined that there is a possibility that the own vehicle hits the object ahead, controls the brake 12 so that a braking effort or braking force may be applied automatically to the own vehicle in order to avoid the possible collision of the own vehicle with the object ahead (in this case, it may also control the engine 10 so that an engine brake may also be applied to the vehicle as the braking force). Further, in the present specification, applying the braking force automatically to the own vehicle in order to avoid the collision is appropriately referred as "automatic braking" or an "automatic braking control" or an "automatic braking action".

While details will be described in the followings, the ECU 20 corresponds to a "vehicle control unit" in accordance with the present invention, and it functions as a "crossing person detecting unit," a "space detecting unit", and a "braking controlling unit" in the present invention.

[Specific Control]

Next, a control related to the automatic braking applied by the ECU 20 in one embodiment of the present invention is described.

Figure 3:
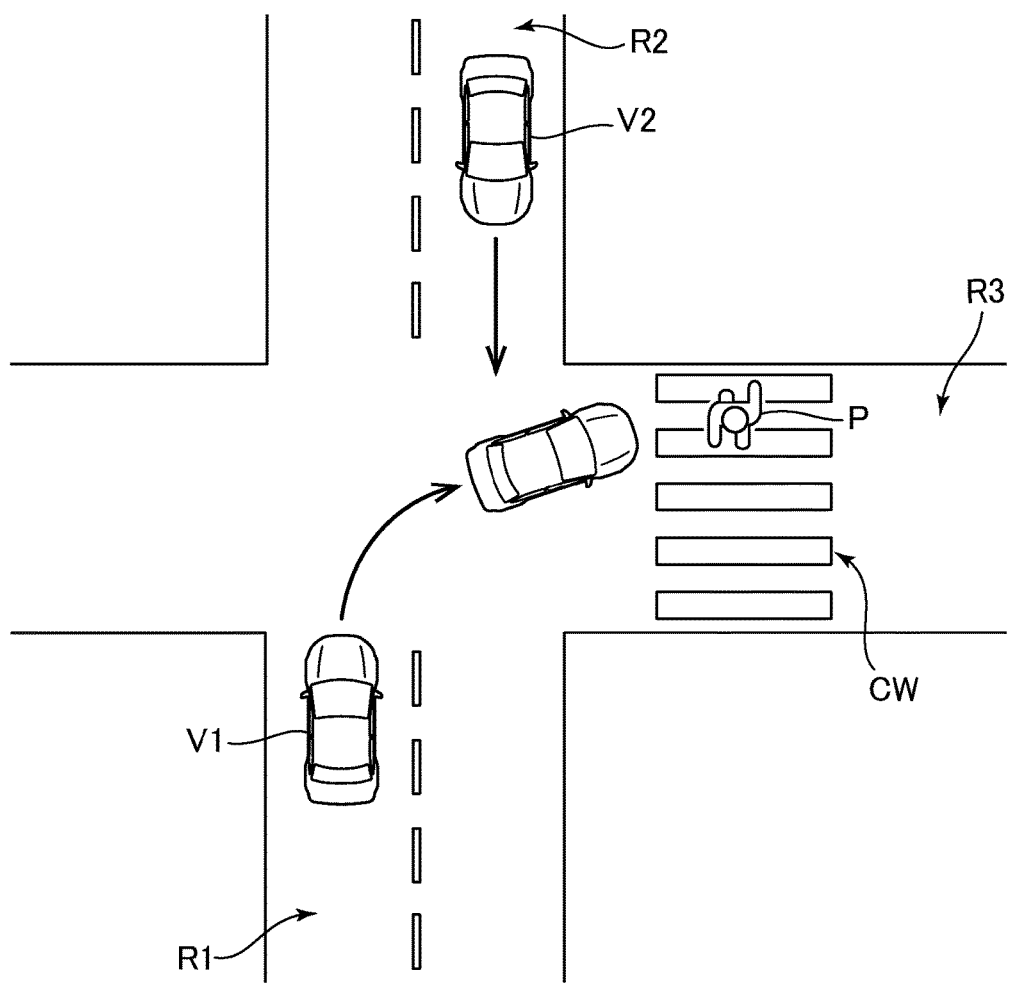
FIG. 3 is an illustrative diagram with respect to problems which may be caused in a case where automatic braking is applied when an own vehicle crosses an opposite lane at an intersection to make a right turn.

First, with reference to FIG. 3, description will be made on problems which may be caused in a case where the automatic braking is applied when the vehicle crosses an opposite traffic lane at an intersection to make a right turn. In FIG. 3, the reference character V1 denotes the own vehicle, the reference character V2 denotes a vehicle approaching on a traffic lane opposite to that of the own vehicle V1 (particularly, the oncoming vehicle corning toward the own vehicle V1 from the front), the reference character R1 denotes a path corresponding to an own lane on Which the own vehicle V1 is running, the reference character R2 denotes a path corresponding to an opposite traffic lane on which the oncoming vehicle V2 is running, the reference character R3 denotes a road which the own vehicle V1 enters after crossing the opposite traffic lane R2 at the intersection to make a right turn, the reference character CW denotes a crosswalk existing near the intersection on the road R3, and the reference character P denotes a crossing person crossing the crosswalk CW (the example shown in FIG. 3 denotes a pedestrian, but a bicycle crossing the crosswalk CW etc. may also be included in the concept of the crossing object). Further, the definitions of the reference characters shown in FIG. 3 are similarly applied to FIGS. 4 to 6 which will be described in the followings.

As shown in FIG. 3, when the vehicle V1 crosses the opposite traffic lane R2 to make a right turn, in a case where there is a crossing person P crossing the road R3 to which the own vehicle V1 is headed to enter by making the right turn, the automatic braking may be applied so that the collision of the own vehicle V1 and the crossing person P may be avoided. In this case, if the own vehicle V1 stops on the opposite traffic lane R2 within the intersection by the application of the automatic braking, there is a possibility that the oncoming vehicle V2 hits the own vehicle V1. By the way, in the above case, it is assumed that when the own vehicle V1 is operated to make a right turn, the relationship between the own vehicle V1 and the oncoming vehicle V2 is that the automatic braking may not be actuated, that is to say, the possibility of the own vehicle V1 colliding with the oncoming vehicle V2 is determined as low, and thus the automatic braking may not be actuated (in the first place, the automatic braking does not have to be actuated in the relationship between the own vehicle V1 and the oncoming vehicle V2).

One of the conceivable ways for avoiding the above described possible collision of the own vehicle V1 with the oncoming vehicle V2, is to apply the automatic braking so that the own vehicle V1 can be stopped on the own lane R1 within the intersection before reaching the opposite traffic lane R2. However, when there is an enough space to the crosswalk on the road R3 to which the own vehicle V1 is headed to enter as a result of the right turn from the opposite traffic lane R2, it may be a more desirable manner of control to apply the automatic braking so that the own vehicle V1 can be stopped within the space which exists up to such crosswalk CW rather than to perform a control wherein the own vehicle V1 is stopped on the own lane R1, since it is predicted that the collision of the own vehicle V1 with the crossing person P and with the oncoming vehicle V2 would be avoided, and at the same time, an intention of a driver trying to make the right turn is given priority. Naturally, when enough space does not exist between the crosswalk CW and the opposite traffic lane R2, the automatic braking may be applied so that the own vehicle V1 can be stopped on the own lane R1.

As described in the above, according to the present embodiment, when the own vehicle V1 crosses the opposite traffic lane R2 at the intersection to make a right turn, if there is a crossing person P crossing the crosswalk CW which is located close to the intersection on the road R3 to which the own vehicle V1 is headed to enter as a result of the right turn, the ECU 20 detects the size of the space between the crosswalk CW and the opposite traffic lane R2 (hereinafter, appropriately referred as a "space up to the crosswalk") to change the timing for applying the automatic braking based on the size of the space SP up to the crosswalk CW Specifically, when the space up to the crosswalk is small, the ECU 20 sets the timing for applying the automatic braking so that the own vehicle V1 can be stopped on the own lane R1 located near side the opposite lane R2 (in this case, the automatic braking may be started relatively early), and when the space before the crosswalk is large enough, the ECU 20 sets the timing for apply the automatic braking so that the own vehicle V1 can be stopped within the space up to the crosswalk (in this case, the automatic braking may be started relatively late) Thereby, the own vehicle V1 is securely prevented from stopping on the opposite traffic lane R2 as the result of the automatic braking.

Figure 4:
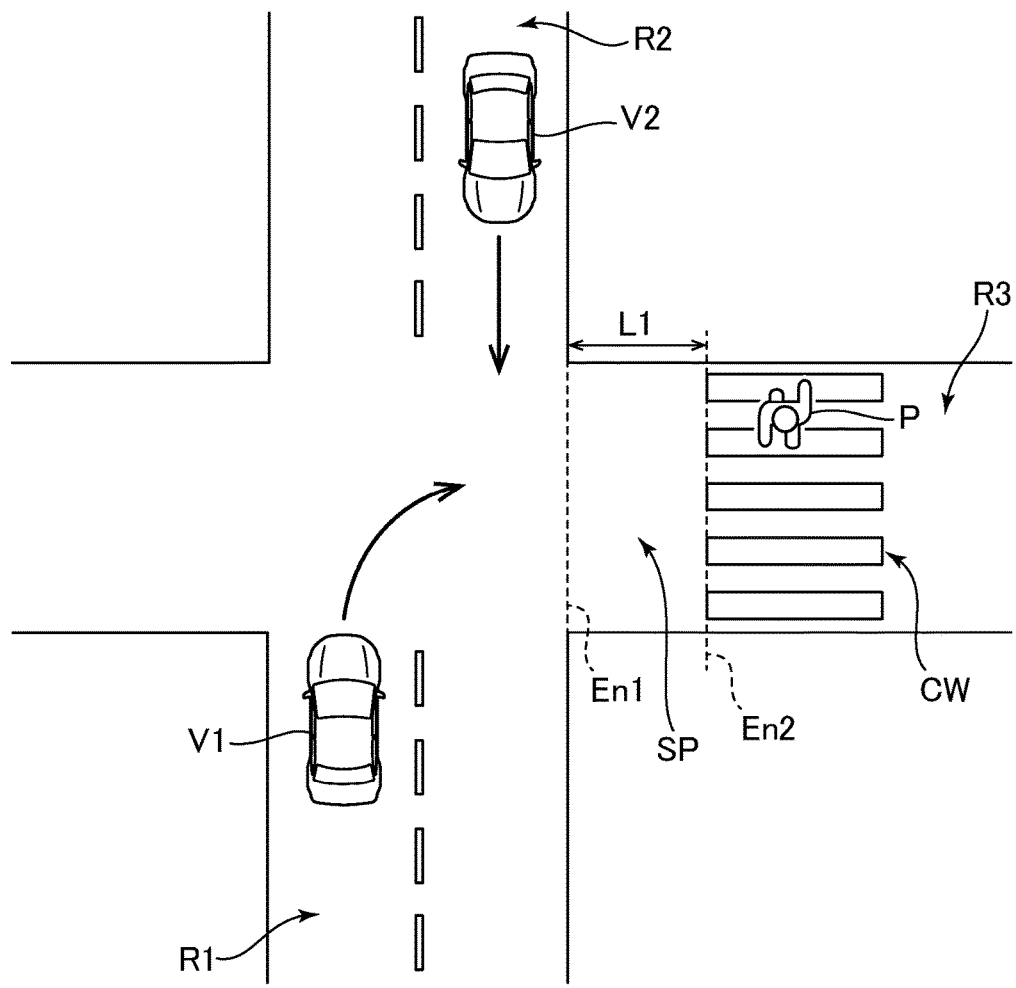
FIG. 4 is an illustrative diagram with respect to a definition of the space between the opposite traffic lane and the crosswalk according to one embodiment of the present invention.
Figure 5:
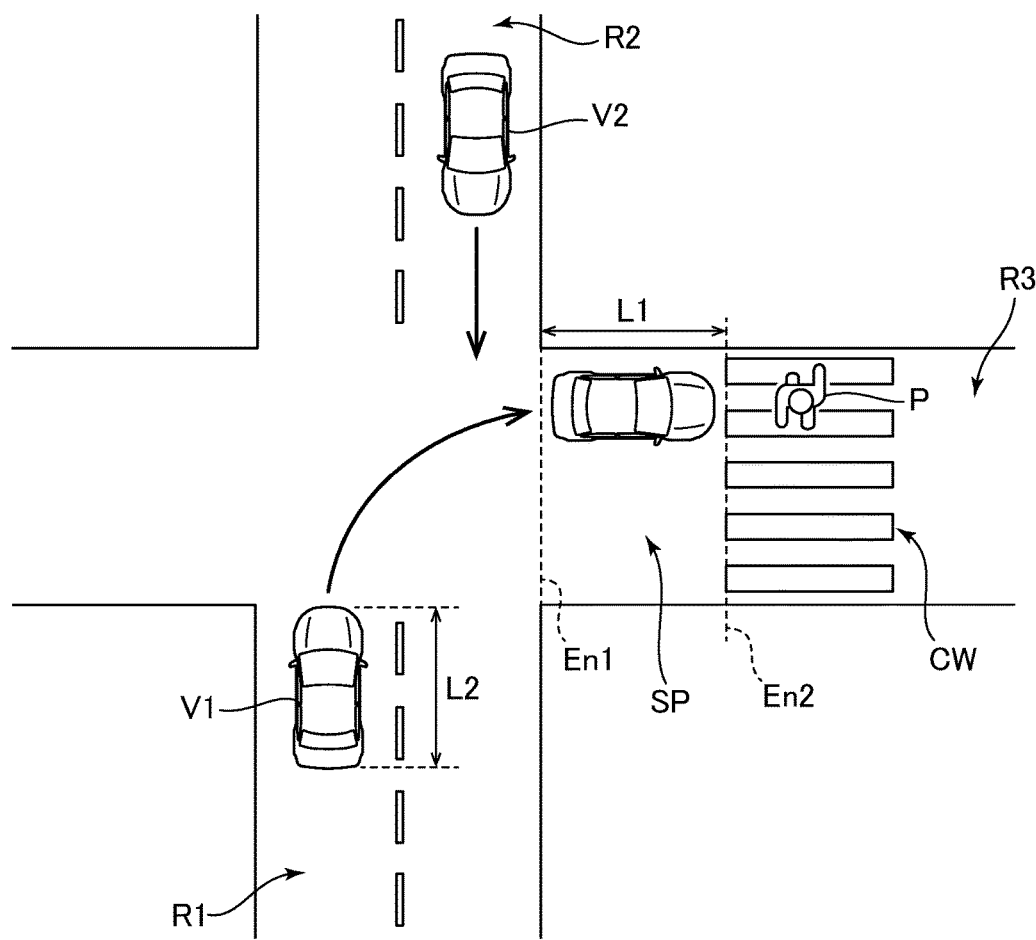
FIG. 5 is an illustrative diagram with respect to an automatic braking control performed when a space to the crosswalk is large in one embodiment of the present invention.
Figure 6:
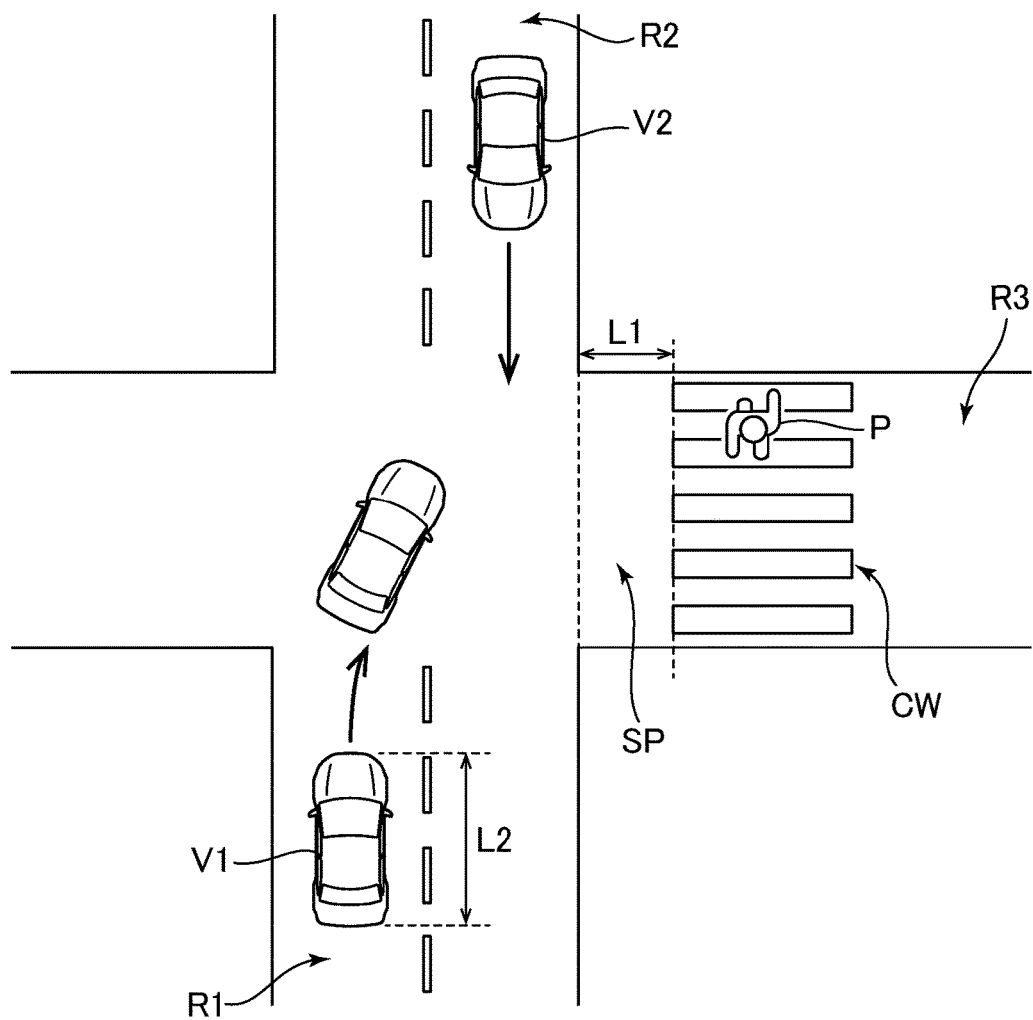
FIG. 6 is an illustrative diagram with respect to an automatic braking control performed when a space to the crosswalk is small in one embodiment of the present invention.

Next, with reference to FIGS. 4 to 6, an automatic braking control according to embodiments of the present invention will be specifically described.

FIG. 4 is an illustrative diagram with respect to the definition of the space up to the crosswalk according to one embodiment of the present invention. In FIG. 4, the reference character SP denotes the space up to the crosswalk, on the road R3 to which the own vehicle V1 id headed to enter after crossing the opposite traffic lane R2 at the intersection to make the right turn, between the crosswalk CW existing close to the intersection and the opposite traffic lane R2. In the present embodiment, use is made of the length L1 along the road R3 between the crosswalk CW side edge En1 of the opposite traffic lane R2 and the opposite traffic lane R2 side edge En2 of the crosswalk CW for determining the size of the space SP up to the crosswalk CW.

FIG. 5 is an illustrative diagram with respect to an automatic braking control performed when the space SP up to the crosswalk CW is large (that is to say, when the length L of the space SP up to the crosswalk CW is long) in accordance with one embodiment of the present invention. In a case shown in FIG. 5, when the own vehicle V1 crosses the opposite traffic lane R2 for making a right turn, it is assumed that there is a crossing person P crossing the crosswalk CW on the road R3 to which the own vehicle V1 is headed to enter after the right turn. Particularly, in the case shown in FIG. 5, the length L1 of the space SP up to the crosswalk CW between the crosswalk CW which the cross-ing person P crosses and the opposite lane R2 is assumed as being longer than the longitudinal length L2 of the own vehicle V1. In this case, the ECU 20 functions to apply the automatic braking so that the own vehicle V1 will be stopped on the road R3 at a side up to the crosswalk, that is to say, within the space SP up to the crosswalk CW. With this control, it is possible to appropriately avoid both collisions of the own vehicle V1 with the crossing person P and the own vehicle V1 and the oncoming vehicle V2.

FIG. 6 is an illustrative diagram with respect to an automatic braking control performed when the space SP up to the crosswalk CW is small (that is to say, when the length L1 of the space SP up to the crosswalk CW is short) in accordance with one embodiment of the present invention. Also in a case shown in FIG. 6, when the own vehicle V1 crosses the opposite traffic lane R2 in making a right turn, it is assumed that there is a crossing person P crossing the crosswalk CW on the road R3 to which the own vehicle V1 is headed to enter by after the right turn. Particularly, in the case shown in FIG. 6, it is assumed that the length L1 of the space SP up to the crosswalk CW between the crosswalk CW on which the crossing person P is crossing and the opposite traffic lane R2 is shorter than the longitudinal length L2 of the own vehicle V1. In this case, if the own vehicle V1 is stopped before the crosswalk CW by the automatic braking as in the case of FIG. 5, there is a possibility that a part of the own vehicle V1 is protruded to the opposite traffic lane R2, and the oncoming vehicle V2 may possibly hit the own vehicle V1. Thus, in order to securely avoid such collision of the own vehicle V1 and the oncoming vehicle V2, the ECU 20 functions to apply the automatic braking so that the own vehicle V1 can be stopped on the own lane R1 at the intersection before entering the opposite traffic lane R2 (with this control, it is also possible to avoid the collision of the own vehicle V1 and the crossing person P as a matter of course).

[Control Flow]

Next, with reference to FIG. 7, a control flow of automatic braking according to one embodiment of the present invention will be described. The flow is executed repeatedly on a predetermined cycle by the ECU 20 in the vehicle 1 (own vehicle V1).

First, in step S11, the ECU 20 determines as to whether or not the own vehicle V1 is controlled to make a right turn. For example, the ECU 20 determines as to whether the own vehicle V1 is being controlled to make a right turn specifically at the intersection, based on a signal from a winker switch and map information which a navigation device has (or map information acquired from a predetermined server). As a result, if it is determined that the own vehicle V1 is being controlled to make a right turn (the step S11: Yes), the process proceeds to step 512, and if it is determined that the own vehicle V1 does not make a right turn (the step S11: No), the process is terminated.

In the step S12, the ECU 20 determines as to whether or not there is a crossing person P crossing a crosswalk CW near an intersection on a road R3 to which the own vehicle V1 is headed to enter as a result of the right turn. For example, the EUC 20 determines as to whether or not there is a crossing person P crossing the crosswalk CW by performing an image processing of image data taken by the forward camera 6 and/or the lateral camera 7. As a result, if it is determined that there is a crossing person P (the step S12: Yes), the process proceeds to step 513, and if it is determined that there is no crossing person P (the step S12: No), the process is terminated.

In the step S13, the ECU 20 detects a length L1 of a space SP up to the crosswalk CW between the crosswalk CW on a road R3 to which the own vehicle V1 is directed to enter by making the right turn and the opposite traffic lane R2. For example, the ECU 20 determines the length L1 of the space SP up to the crosswalk CW by performing the image processing of image data taken by the forward camera 6 and/or the lateral camera 7, and/or referring to the map information which the navigation device has (or the map information acquired from the predetermined server).

Next, in step S14, the ECU 20 determines as to whether or not the length L1 of the space SP up to the crosswalk CW detected in the step S13 is shorter than the longitudinal length L2 of the own vehicle V1. In this case, the ECU 20 uses the longitudinal length L2 of the own vehicle V1 stored in a memory in advance.

As a result of the determination in the step S14, if it is determined that the length L1 of the space SP up to the crosswalk CW is shorter than the longitudinal length L2 of the own vehicle V1 (the step S14: Yes), the process proceeds to step S15. In the step S15, the ECU 20 sets a Predicted Time before Collision threshold value which is to be applied as a Predicted Time before Collision or a Time to Collision (hereinafter simply referred as "TTC") for determining timing for executing the automatic braking so that the own vehicle V1 can be stopped on the own lane R1 before entering the opposite traffic lane R2. The TTC is a time acquired by dividing the distance from the own vehicle V1 to the crossing person P by the relative speed of the own vehicle V1 to the crossing person P (the speed of the own vehicle V1 may be used directly under an assumption that the speed of the crossing person P is 0), and basically, when the TTC is at or lower than the TTC threshold value, the automatic braking is actuated. When the length L1 of the space SP up to the crosswalk CW is shorter than the longitudinal length L2 of the own vehicle V1, the ECU 20 sets the TTC threshold value longer than a standard value (for example 2 seconds) which is used in normal conditions (for example, when the own vehicle V1 does not cross the opposite traffic lane R2 to make a right turn, and/or when there is no crossing person P crossing the road R3 to which the own vehicle V1 is directed to enter by making the right turn, and hereinafter similarly referred as above). With this control, the own vehicle V1 is stopped within the intersection on the own lane R1, before entering the opposite lane R2, by the automatic braking.

On the other hand, as a result of the determination in the step S14, if it is found that the length L1 of the space SP before the crosswalk CW is not shorter than the longitudinal length L2 of the own vehicle V1 (the step S14: No), that is to say, the length L1 of the space SP up to the crosswalk CW is longer than the longitudinal length L2 of the own vehicle V1, the process proceeds to step S16. In the step S16, the ECU 20 sets the TTC threshold value for determining the timing to execute the automatic braking so that the own vehicle V1 can be stopped on the road R3 up to the crosswalk CW, that is to say, within the space SP up to the crosswalk CW. Specifically, when the length L1 of the space SP up to the crosswalk CW is longer than the longitudinal length L2 of the own vehicle V1, the ECU 20 sets the TTC threshold value shorter than the standard value which is to be used in normal conditions so that the own vehicle V1 can be stopped within the space SP up to the crosswalk CW by the automatic braking.

After the above described steps S15 and S16, the process proceeds to step S17. In the step S17, the ECU 20 calculates the TTC (Time to Collision) of the own vehicle V1 and the crossing person P. In this case, the ECU 20 determines the distance from the own vehicle V1 to the crossing person P, and the relative speed of the own vehicle V1 with respect to the crossing person P (the speed of the own vehicle V1 may be used directly with an assumption that the speed of the crossing person P is 0) based on at least one or more of the signal input from the millimeter-wave radar 2, the signal input from the ultrasonic sensor 4, the image data shot by the front camera 6 and/or the lateral camera 7, and the signal input from the vehicle speed sensor 8.

Next, in step S18, the ECU 20 determines as to whether the TTC calculated in the step S17 is at or lower than the TTC threshold value set in the steps S15 or S16. As a result, if it is determined that the TTC is at or lower than the TTC threshold value (the step S18: Yes), the process proceeds to step S19, and the EUC 20 actuates the automatic braking. Specifically, the ECU 20 controls the brake 12 so that a braking force is applied to the own vehicle V1 (in particular, a control signal is provided to an actuator of the brake 12). For example, the ECU 20 controls the brake 12 so that a maximum braking effort can be applied to the own vehicle. On the other hand, if it is determined that the TTC is not at or lower than the TTC threshold value (the step S18: No), the process returns to the step S17. In this case, the ECU 20 performs the process of calculating the TTC and the process of determining the TTC repeatedly until the TTC is found to be at or lower than the TTC threshold value.

[Operational Effects]

Next, functional and meritorious effects of the vehicle control device according to embodiments of the present invention will be described.

In the present embodiments, when the own vehicle V1 crosses an opposite traffic lane R2 at an intersection to make a right turn, if there is a crossing person P crossing the crosswalk CW close to the intersection on a road R3 to which the own vehicle V1 is directed to enter by making a right or left turn, the size of a space SP up to the crosswalk CW from the opposite traffic lane R2 is detected, and the timing for applying the automatic braking is changed based on the size of the space SP up to the crosswalk CW. Particularly, in the present embodiments, use is made of the length L1 of the space SP up to the crosswalk CW along the road R3 to which the own vehicle V1 is directed to enter by making a right turn as the size of the space SP up to the crosswalk CW to change the timing for applying the automatic braking depending on the dimensional relationship between the length L1 of the space SP up to the crosswalk CW and the longitudinal length L2 of the own vehicle V1. Specifically, when the length L1 of the space SP up to the crosswalk CW is shorter than the longitudinal length L2 of the own vehicle V1, the timing for starting the automatic braking is made earlier than when the length L1 of the space SP up to the crosswalk CW is longer than the longitudinal length L2 of the own vehicle V1.

According to the present embodiments constructed as described, when the space SP up to the crosswalk CW is small, the automatic braking may be applied relatively early to thereby stop the own vehicle V1 on the own lane R1 before entering the opposite traffic lane R2. On the other hand, when the space SP up to the crosswalk CW is large, the automatic braking is applied at a relatively late timing to thereby stop the own vehicle V1 within the space SP up to the crosswalk CW. Thus, according to the present embodiments, it is possible to stop the own vehicle V1 by the automatic braking at an appropriate position depending on the situation so as to appropriately avoid both collisions of the own vehicle V1 with the crossing person P, and the own vehicle V1 with the oncoming vehicle V2. In addition, according to the present embodiments, when the space SP up to the crosswalk CW is large, since the automatic braking is applied so that the own vehicle V1 can be stopped within the space SP up to the crosswalk CW from the opposite traffic lane R2, it is possible to appropriately realize the automatic braking in which an intention of a driver trying to make a right turn is given priority.

Particularly, in the present embodiments, when the length L1 of the space SP up to the crosswalk CW is shorter than the longitudinal length L2 of the own vehicle V1, since the TTC threshold value used for the TTC is set to a larger value used in a case where the length L1 of the space SP up to the crosswalk CW is longer than the longitudinal length L2 of the own vehicle V1 so as to make the timing for starting the automatic braking earlier, it is possible to securely stop the own vehicle V1 at an appropriate position by the automatic braking.

[Modifications]

In the above described embodiments, regardless of the possibility that the own vehicle V1 collides with the oncoming vehicle V2, the automatic braking is applied based only on the relationship between the own vehicle V1 and the crossing person P, in another example, the control may be such that, the possibility of the own vehicle V1 colliding with the oncoming vehicle V2 is determined, and if it is determined that there is no possibility of the own vehicle V1 colliding with the oncoming vehicle V2, the automatic braking may not be applied. Specifically, if the TTC (Time to Collision) of the own vehicle V1 and the oncoming vehicle V2 when the own vehicle V1 is being controlled to cross the opposite traffic lane R2 at the intersection to make a turn exceeds the TTC threshold value (standard value) used in normal conditions, the ECU 20 may inhibit execution of the automatic braking, and may give an alarm to the driver. For example, the ECU 20 may perform a control to display a predetermined image and/or a control to produce a predetermined sound to thereby give an alarm to the driver that an attention should be paid to the oncoming vehicle V2 and/or the crossing person P when making a right or left turn. In such modification, the ECU functions as an "alarm controlling device" in the present invention.

In the above described embodiments, while an example in which the present invention is applied in a case where the own vehicle V1 crosses the opposite traffic lane R2 at the intersection to make a right turn has been described, this embodiment is contemplated for countries adopting a left-lane traffic regulation where drivers are obliged to keep the left side of the road. In another example, in countries adopting a right-lane traffic regulation where drivers are obliged to keep the right side of the road, the present invention may be applied in a case where the own vehicle V1 crosses the opposite traffic lane R2 at the intersection to make a left turn.

In the above embodiments, the TTC (Time to Collision) has been used to apply the automatic braking, but a so-called Time Headway (THW) may be used instead of the TTC. The Time Headway is acquired by dividing a distance from the vehicle V1 to a target which is present ahead by vehicle speed of the vehicle V1.

What is claimed is:

1. A vehicle control device, comprising:
a brake which applies a braking force to a vehicle; and
a controller which is configured to control the brake for braking the vehicle,
wherein the controller is configure to:
when the vehicle crosses an opposite traffic lane at an intersection to make a right or left turn, detect a presence of a crossing person crossing a crosswalk existing near the intersection and on a road to which the vehicle is directed to enter by making the right or left turn;
when the presence of the crossing person crossing the crosswalk is detected, detect a size of a space between the crosswalk and the opposite traffic lane, wherein the size of the space is a length of the space along the road to which the vehicle is directed to enter by making the right or left turn; and
perform a control for braking the vehicle by controlling the brake in order to avoid a collision of the vehicle with the crossing person,
wherein, when the length of the space is shorter than a longitudinal length of the vehicle, the controller is configured to set a timing for performing the control for braking the vehicle so that the vehicle can be stopped within an own lane before reaching the opposite traffic lane by performing the control for braking the vehicle, and
wherein, when the length of the space is longer than the longitudinal length, the controller is configured to set the timing for performing the control for braking the vehicle so that the vehicle can be stopped within the space by performing the control for braking the vehicle.

2. The vehicle control device according to claim 1, wherein, when the length of the space is shorter than the longitudinal length, the controller is configured to make a timing for starting the control for braking the vehicle earlier than when the length of the space is longer than the longitudinal length.

3. The vehicle control device according to claim 2, wherein the controller is configured to determine a Time to Collision of the vehicle with respect to the crossing person, based on a distance from the vehicle to the crossing person and a relative speed of the vehicle with respect to the crossing person, in order to start the control for braking the vehicle when the Time to Collision becomes equal to or smaller than a predetermined threshold value, and
wherein, when the length of the space is shorter than the longitudinal length, the controller is configured to set the threshold value larger than when the length of the space is longer than the longitudinal length, in order to make the timing for starting the control earlier.

4. The vehicle control device according to claim 1, wherein, when the vehicle crosses the opposite traffic lane to make the right or left turn, the controller is configured to determine a possibility of the vehicle colliding with another vehicle approaching on the opposite traffic lane, and
wherein, when it is determined that there is no possibility of the vehicle colliding with another vehicle, the controller is configured to inhibit execution of the control for braking the vehicle, and to provide an alarm to a driver.

* * * * *